US010689284B2

(12) United States Patent
Gibson et al.

(10) Patent No.: US 10,689,284 B2
(45) Date of Patent: Jun. 23, 2020

(54) INFRARED (IR) TRANSMITTING GRADED INDEX (GRIN) OPTICAL ELEMENTS AND METHOD FOR MAKING SAME

(75) Inventors: Daniel J. Gibson, Cheverly, MD (US); Jasbinder S. Sanghera, Ashburn, VA (US); Guillermo R. Villalobos, Springfield, VA (US); Ishwar D. Aggarwal, Chapel Hill, NC (US); Dean A Scribner, Arlington, VA (US)

(73) Assignee: THE GOVERNMENT OF THE UNITED STATES, AS REPRESENTED BY THE SECRETARY OF THE NAVY, Arlington, VA (US)

( * ) Notice: Subject to any disclaimer, the term of this patent is extended or adjusted under 35 U.S.C. 154(b) by 1224 days.

(21) Appl. No.: 13/370,485

(22) Filed: Feb. 10, 2012

(65) Prior Publication Data
US 2012/0206796 A1    Aug. 16, 2012

Related U.S. Application Data

(60) Provisional application No. 61/441,778, filed on Feb. 11, 2011.

(51) Int. Cl.
C03B 23/20        (2006.01)
(52) U.S. Cl.
CPC ................... *C03B 23/20* (2013.01)
(58) Field of Classification Search
CPC .......... G02B 27/02; G02B 27/10; G02B 3/00; G02B 3/0087; C03B 23/0006; C03B 23/013; C03B 23/02; C03B 23/20; C03B 23/203; C03B 23/006; C03B 23/22

USPC ............... 359/356, 652, 653, 654; 385/124; 65/102, 183, 401
See application file for complete search history.

(56) References Cited

U.S. PATENT DOCUMENTS

| | | | | |
|---|---|---|---|---|
| 2,992,517 A * | 7/1961 | Hicks, Jr. | ......................... | 65/401 |
| 3,078,695 A * | 2/1963 | Kozak et al. | .................. | 65/183 |
| 3,798,015 A * | 3/1974 | Brichard | ........................... | 65/95 |
| 3,825,315 A * | 7/1974 | Altman et al. | ................ | 250/349 |
| 4,082,108 A * | 4/1978 | Dininio | ....................... | 137/269.5 |
| 4,217,318 A * | 8/1980 | Anderson | ..................... | 264/1.23 |
| 4,451,116 A * | 5/1984 | Pinnow et al. | .............. | 385/142 |
| 4,867,544 A * | 9/1989 | Bornstein et al. | ............ | 359/356 |

(Continued)

OTHER PUBLICATIONS

Beadie et al., "Optical properties of a bio-inspired gradient refractive index polymer lens," Opt. Exp., 16 (15), 11540-11547 (2008).*

(Continued)

*Primary Examiner* — Derek S. Chapel
*Assistant Examiner* — Adam W Booher
(74) *Attorney, Agent, or Firm* — Naval Research Laboratory

(57) ABSTRACT

The present invention is directed to a method for making infrared transmitting graded index optical elements by selecting at least two different infrared-transmitting materials, each with a different refractive index, having similar thermo-viscous behavior; assembling the infrared-transmitting materials into a stack comprising one or more layers of each infrared-transmitting material resulting in the stack having a graded index profile; and forming the stack into a desired shape. Also disclosed is the related optical element made by this method.

13 Claims, 4 Drawing Sheets

Ribbons/plates          GRIN Lens blank          Shape in spherical mold          IR GRIN Lens 15% [As 35.5% - S 64.5%] +
85% [As 40% - S 40% - Se 20%]
n=2.496

85% [As 35.5% - S 64.5%] +
15% [As 40% - S 40% - Se 20%]
n=2.334

(a)

(b)

(56) References Cited

U.S. PATENT DOCUMENTS

| | | | | |
|---|---|---|---|---|
| 4,929,065 | A | * | 5/1990 | Hagerty et al. .............. 359/653 |
| 5,080,706 | A | * | 1/1992 | Snyder et al. .................. 65/102 |
| 6,172,817 | B1 | | 1/2001 | Senapati et al. |
| 6,222,686 | B1 | * | 4/2001 | Richard ........................ 359/802 |
| 6,553,790 | B1 | * | 4/2003 | Fleming, Jr. ...... C03B 37/01211 65/102 |
| 6,696,142 | B2 | | 2/2004 | Baer et al. |
| 6,863,842 | B2 | * | 3/2005 | Hasegawa ..................... 252/584 |
| 7,002,754 | B2 | | 2/2006 | Baer et al. |
| 7,616,856 | B2 | * | 11/2009 | Zhou et al. .................. 385/124 |

OTHER PUBLICATIONS

Schott, Infrared Chalcogenide Glasses, http://buyersguide.pennwell.com/Shared/User/cy86c5038895c340968960ef2a96707b17.pdf, created Dec. 2009, accessed Aug. 23, 2016.*

Polycarbonate Information and Properties, Polymer Processing.com, http://www.polymerprocessing.com/polymers/PC.html, created 2001, accessed Aug. 23, 2016.*

Ashby, Michael F., Materials Selection in Mechanical Design, 2005, p. 519.*

Optical Constants of VITRON-IG, IG3, http://refractiveindex.info/?shelf=glass&book=VITRON-IG&page=IG3, copyright 2008-2016, accessed Aug. 23, 2016.*

Optical Constants of VITRON-IG, IG5, http://refractiveindex.info/?shelf=glass&book=VITRON-IG&page=IG5, copyright 2008-2016, accessed Aug. 23, 2016.*

Cardinal et al., Non-linear optical properties of chalcogenide glasses in the system As-S-Se, Journal of Non-Crystalline Solids, 256 & 257, 1999, pp. 353-360.*

Glaze et al., Properties of Arsenic Sulfide Glass, Journal of Research of the National Bureau of Standards, vol. 59, No. 2, Aug. 1957, pp. 83-92.*

R. Frerichs, New Optical Glasses with Good Transparency in the Infrared, Journal of the Optical Society of America, vol. 43, No. 12, Dec. 1953, pp. 1153-1157.*

Scripachev et al., Optical and mechanical characteristics of fibers made of arsenic chalcogenides, Journal of Optoelectronics and Advanced Materials, vol. 3, No. 2, Jun. 2001, p. 351-360 (Year: 2001).*

Frerichs, New Optical Glasses with Good Transparency in the Infrared, Journal of the Optical Society of America, vol. 43, No. 12, Dec. 1953, p. 1153-1157 (Year: 1953).*

Beadie et al., "Optical properties of a bio-inspired gradient refractive index polymer lens," Optics Express, Jul. 21, 2008, vol. 16, No. 15, 11540-11547.

* cited by examiner

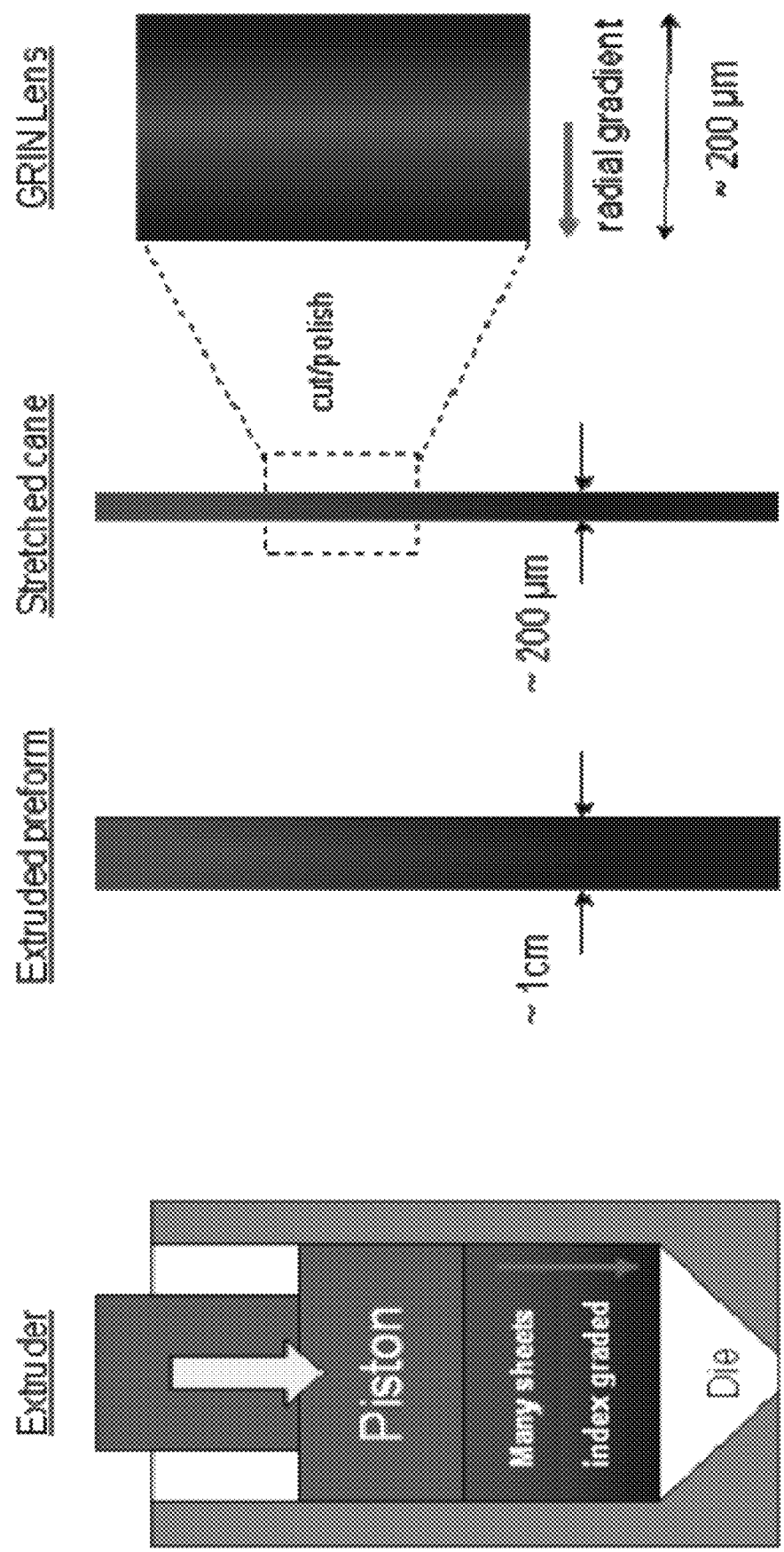

INFRARED (IR) TRANSMITTING GRADED INDEX (GRIN) OPTICAL ELEMENTS AND METHOD FOR MAKING SAME

PRIORITY CLAIM

The present application is a nonprovisional application of U.S. Provisional Application No. 61/441,778 filed on Feb. 11, 2011 by Daniel J. Gibson et al., entitled "Infrared Transmitting Graded Index Optical Elements and Method for Making Same," the entire contents of which is incorporated herein by reference.

BACKGROUND OF THE INVENTION

Field of the Invention

The present invention relates generally to optical elements and more specifically to infrared transmitting graded index optical elements.

Description of the Prior Art

Graded index (GRIN) optics focus light through the use of an index profile in the lens instead of refracting the light of each surface as is the case in conventional lenses. For example, the flat ends of a GRIN lens enable more efficient coupling to fiber optics. GRIN lenses can reduce aberrations, and replace multiple lens elements in a lens system thereby permitting compact, lightweight lenses to replace bulky heavy lenses in existing systems.

Currently, GRIN optics are made from monovalent ion-doped silicate glasses or polymers. In both cases, there is no light transmission in the infrared (IR) beyond a wavelength of about two microns, an important wavelength region for many applications, such as sensing. The method used to make the silicate GRIN optics relies on ionic diffusion from the outside surface to the inside to create the index profile. This is a slow process since the diffusion lengths are large. For example, it can take as long as 200 hours to ion exchange a 2 mm thick silicate glass to make a GRIN lens. Additionally, diffusion limits the complexity of the profiles that can be made using traditional ion exchange. The polymer systems suffer from a small index difference (~0.1). This limits the usefulness of polymer GRIN lenses.

A microlayering/molding process has been used to fabricate plano-convex GRIN lenses from alternating layers of two immiscible polymers in a structure that mimics the ocular lens of fish (Beadie et al., "Optical properties of a bio-inspired gradient refractive index polymer lens," *Opt. Exp.*, 16 (15), 11540-11547 (2008), the entire contents of which is incorporated herein by reference). These lenses are not suitable for IR light due to the high IR absorption of polymers. IR light is defined as a wavelength beyond about 2 µm. For example in the 2-5 µm region, the 8-12 µm region, and the 2-12 µm region. Further, those skilled in the art, will quickly see that the process is not applicable to IR materials since such materials (IR crystals and ceramics) do not exhibit the plasticity needed for microlayer extrusion.

BRIEF SUMMARY OF THE INVENTION

The aforementioned problems are overcome in the present invention which provides a method for making infrared transmitting graded index optical elements by selecting at least two different infrared-transmitting materials, each with a different refractive index, having similar thermo-viscous behavior; assembling the infrared-transmitting materials into a stack comprising one or more layers of each infrared-transmitting material, resulting in the stack having a graded index profile; and forming the stack into a desired shape. Also disclosed is the related optical element made by this method.

These and other features and advantages of the invention, as well as the invention itself, will become better understood by reference to the following detailed description, appended claims, and accompanying drawings.

BRIEF DESCRIPTION OF THE DRAWINGS

FIG. 4 shows the process of extruding many sheets into a preform having a radially graded refractive index profile and stretching the preform to achieve a small diameter cane (~200 µm) with a radially graded index.

DETAILED DESCRIPTION OF THE INVENTION

Figure 1:
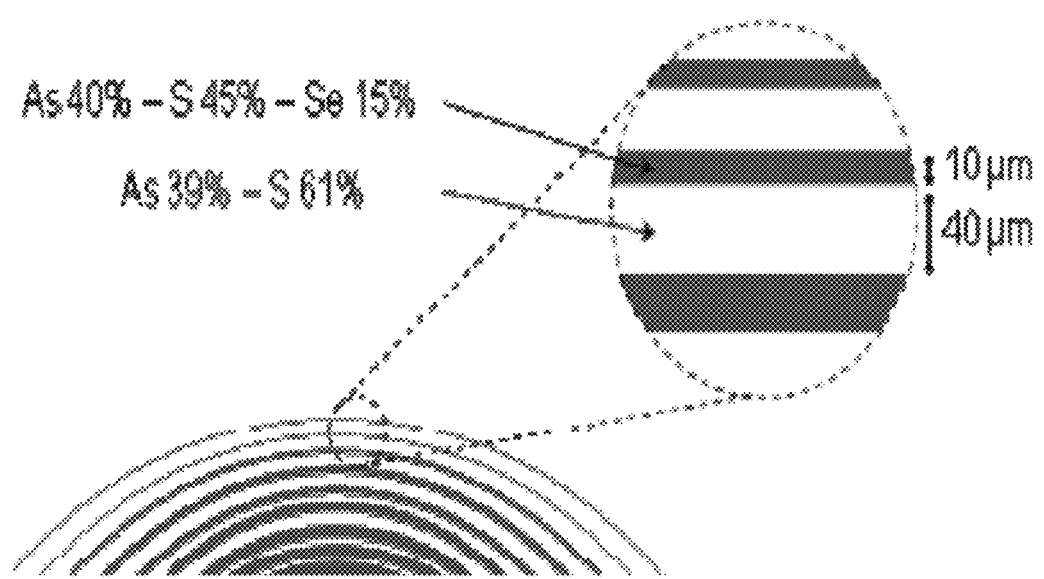
FIG. 1 shows the plano-convex IR GRIN lens of Example 1 comprising alternating layers of As 39%-S 61% (n=2.38) and As 40%-S 45%-Se 15% (n=2.46). Layer pair thicknesses are ~50 µm, and the ratio of the thicknesses of the 2 glasses is graded throughout the lens.

The present invention pertains to IR GRIN optical elements and a method for creating IR GRIN optical elements. The optical elements are comprised of multiple IR-transmitting glasses, crystals, and ceramics, each with a different refractive index. The IR-transmitting materials are placed in a specific arrangement to achieve the desired optical performance for the intended application, including beam focusing, beam diverging, optical fiber coupling, beam combining/splitting and waveguiding. The actual arrangement of the glass components in the optical element depends on the optical design and may be fabricated using the method described.

The method includes the selection of appropriate IR glass compositions spanning a wide range of refractive indices (2.2 to 3.4), and having similar thermo-viscous behavior. For example, their glass transition temperatures should be within +/−20° C. of one another, and typically within +/−10° C., and more typically within +/−5° C. of each other. The number of compositions, as well as the refractive index difference between each composition, called the n-step, depends on the design of the optic. The set of glasses will span a wide range of refractive index, called the delta-n, as required by the design. The glasses can them be assembled into the desired shape using several approaches.

The main approach is to assemble multiple layers (essentially thin sheets) of varying glass compositions and therefore varying refractive index. A large number of sheets, are fabricated in a stack. The stack, with an associated graded index profile, is then pressed inside a shaped mold, which, for example, may be shaped like a ball and socket, resulting in a thin plate with spherical curvature. The radius of the curvature is relatively large compared to the thickness of the stack. Different lens geometries can then be obtained by trimming, for example, the concave portion of the molded plate can be ground flat, resulting in a plano-convex lens with a graded index. Instead of molding, the plate can be shaped into a curved surface using hydrostatic pressure or blow molding. Alternatively, the stack could be extruded through an orifice resulting in a thin rod with a radially graded index. Sections of this rod can be sliced and polished to form graded index optical elements.

The multi-layered glass stacks can be fabricated by pressing them into thin sheets under load (under vacuum or inert gas or reactive gas), drawing thin ribbons of glass from a melt crucible, extruding a stack of glass plates into a ribbon or extruding multiple glasses into a sheet/ribbon using a co-extrusion die. The multilayered glass stacks are comprised of individual glass sheets, each with a different composition and refractive index. These sheets can be fabricated by similar means, except care must be taken to control the composition/refractive index of the different sheets. This can be achieved by precise metering of the constituent elements during sheet fabrication, or by mixing two or more baseline glass compositions, in precisely controlled ratios, during the sheet fabrication process.

While this disclosure describes GRIN optics and lenses operating in the infrared, the methods and products disclosed are not limited to only IR glasses and optics. The methods can also be used for other glasses and polymers to create optics that function at other wavelengths/frequencies and wavelength/frequency ranges including visible, near-IR, mid-IR, far-IR and THz wavelengths/frequencies.

Example 1

A plano-convex IR GRIN lens was comprised of alternating layers of As 39%-S 61% (n=2.38) and As 40%-S 45%-Se 15% (n=2.46). Layer pair thicknesses were ~50 µm, and the ratio of the thicknesses of the 2 glasses was graded throughout the lens (FIG. 1).

Example 2

An IR grin lens comprised of a mixture of As 40%-S 40%-Se 20% (n=2.53) and As 35.5%-S 64.5% (n=2.30.) The lens was fabricated from glass ribbons/plates made using extrusion. The ribbons were comprised of a mixture of high-index and low-index glass in varying proportion. The glasses were mixed during extrusion and the ratio of high-index glass to low index glass was precisely controlled. Ribbons at the top of the lens blank were comprised of 85% of the high-index glass and 15% of the low-index glass for a weighted average index of 2.496. Ribbons at the bottom of the lens blank were comprised of 15% of the high-index glass and 85% of the low-index glass for a weighted average index of 2.334. The proportion of high-index glass to low-index glass varied linearly along the height of the lens blank resulting in a graded index optic in the mid-IR (2-5 µm), as shown in FIG. 2a.

Example 3

Figure 2:
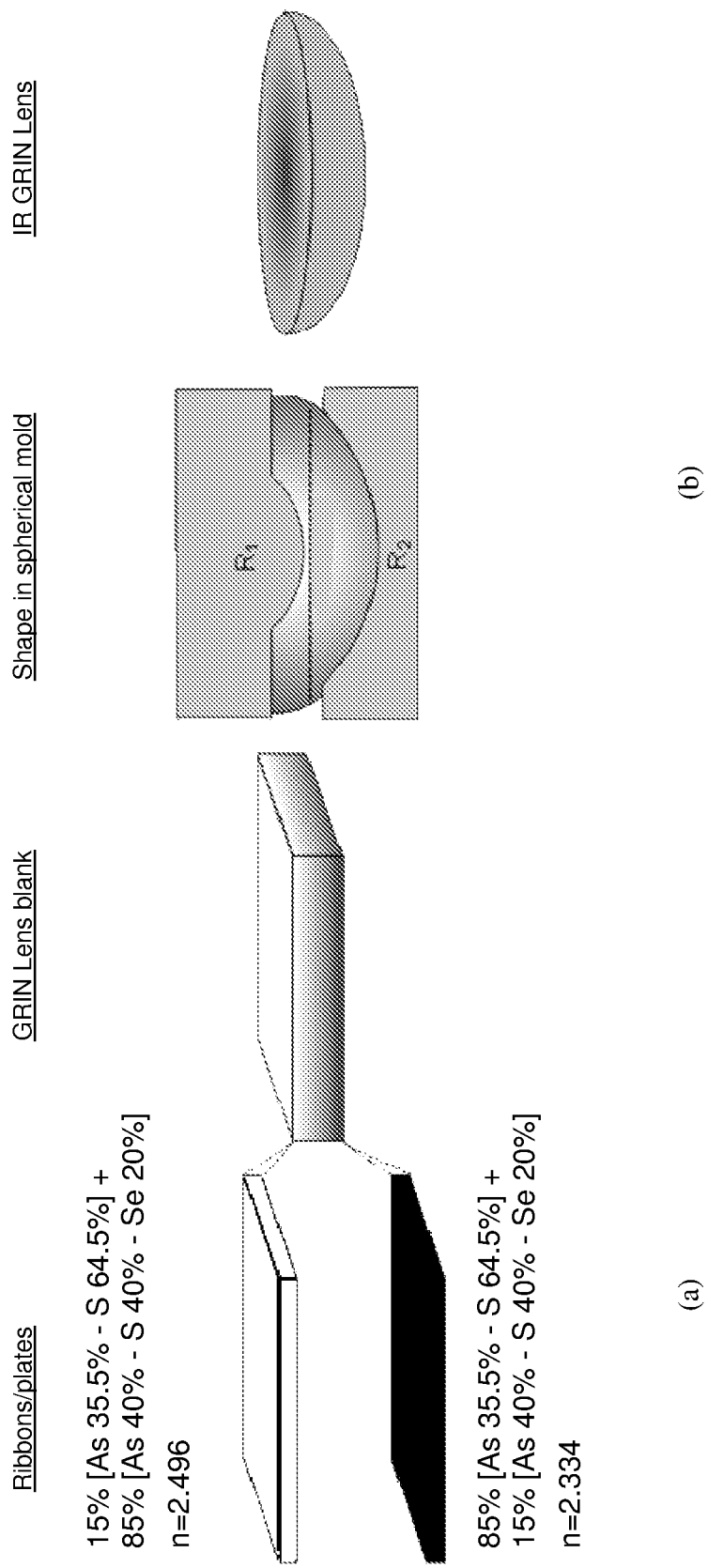
FIG. 2(a) shows the IR grin lens of Example 2 demonstrating that the proportion of high-index glass to low-index glass varies linearly along the height of the lens blank resulting in a graded index optic in the mid-IR (2-5 µm).
FIG. 2(b) shows the IR GRIN optic of Example 2 shaped in a spherical mold and finished to produce a plano-convex GRIN lens optic.

The IR Grin optic of example 2 was shaped in a spherical mold and finished as shown in FIG. 2b to produce a plano-convex GRIN lens optic.

Example 4

Figure 3:
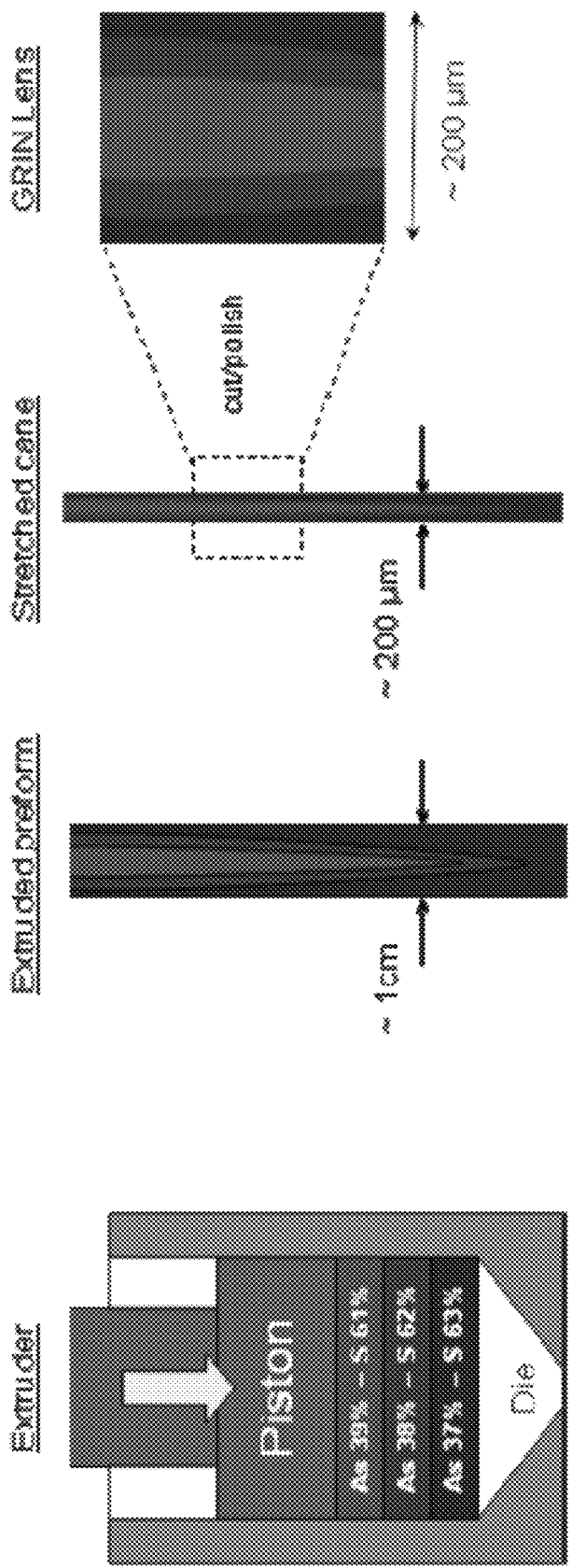
FIG. 3 shows the process of extruding a stack of 3 different IR glass compositions into a preform having a radially-stepped refractive index profile and stretching the preform on a fiber draw tower to achieve a small diameter (200 µm) cane with a radially graded index.

This example consisted of a GRIN optic made from only a few sheets of glass with large thicknesses (up to 1 mm and thicker) as shown in FIG. 3. The three different IR glass compositions were, As 39%-S 61% (n=2.386), As 38%-S 62% (n=2.380), and As 37%-S 63% (n=2.369), respectively. The part was made by fusing three polished glass sheets together above their glass transition temperatures.

Example 5

A stack of 3 different IR glass compositions, As 39%-S 61% (n=2.386), As 38%-S 62% (n=2.380), and As 37%-S 63% (n=2.369), was extruded into a rod having a radially-stepped refractive index profile. This rod was then stretched on a fiber draw tower to achieve a small diameter (200 µm) rod with a radially graded index (FIG. 3).

Example 6

As shown in FIG. 4, a stack of plates or ribbons, each having a different average refractive index, due to its composition, was extruded through a die resulting in a preform having a radially graded refractive index profile. This preform was then stretched on a fiber draw tower to achieve a small diameter (200 µm) rod or cane with a radially graded index. A portion can be cut from this cane and polished into a cylindrical IR GRIN lens, with a radial GRIN profile.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method of forming an optical stack for an infrared-transmitting graded index optical element, comprising:
    assembling a plurality of layer pairs into a stack such that each layer pair is in contact with at least one other layer pair, wherein each layer pair includes a first material layer of a first material disposed adjacent to and in contact with a second material layer of second material, different from the first material,
    wherein the first material and the second material are infrared-transmitting materials,
    wherein a glass transition temperature of the first material is within 5° C. of a glass transition temperature of the second material, and
    wherein the first infrared transmitting material is $As_{40} S_{40}$ and $Se_{20}$ and the second infrared transmitting material is $As_{35.5}$ and $S_{64.5}$.

2. The method of claim 1,
    wherein each of the plurality of layer pairs has a thickness ratio defined by a thickness of the first material layer relative to a thickness of the second material layer, and
    wherein a thickness ratio for a layer pair disposed at one end of the stack is different from a thickness ratio for a layer pair disposed at another end of the stack.

3. The method of claim 1, wherein each of the plurality of layer pairs has a thickness ratio defined by a thickness of the first material layer relative to a thickness of the second material layer, and
    wherein thickness ratios for the plurality of layer pairs increase from one end of the stack to another end of the stack.

4. The method of claim 3, wherein the increase is linear.

5. The method of claim 1, wherein a thickness of each layer pair is approximately 50 microns.

6. A method of forming an infrared transmitting optical element, comprising:
assembling a plurality of infrared transmitting plates into a stack,
wherein each of the plurality of infrared transmitting plates includes a first infrared transmitting glass material and a second infrared transmitting glass material,
wherein the first infrared transmitting glass material has a higher index of refraction than the second infrared transmitting glass material,
wherein a difference in glass transition temperatures between adjacent infrared transmitting plates is equal to or less than 5° C.,
wherein an infrared transmitting plate located at a first end of the stack is comprised of a majority of the first infrared transmitting glass material,
wherein an infrared transmitting plate located at a second end of the stack is comprised of a majority of the second infrared transmitting glass material, and
wherein the first infrared transmitting material is $As_{40}S_{40}$ and $Se_{20}$ and the second infrared transmitting material is $As_{35.5}$ and $S_{64.5}$.

7. The method of claim 6, wherein a ratio of the first infrared transmitting material to the second infrared transmitting material within each infrared transmitting plate increases in a direction from the second end of the stack to the first end of the stack.

8. The method of claim 7, wherein the increase is linear.

9. The method of claim 6, wherein the stack is a graded index optic constructed to transmit infrared light with wavelengths between 2 microns and 5 microns, inclusive.

10. A method of forming an infrared-transmitting graded optic, comprising:
assembling a first infrared transmitting glass composition, a second infrared transmitting glass composition, and a third infrared transmitting glass composition into a stack,
wherein the first infrared transmitting glass composition has a first index of refraction, the second infrared transmitting glass composition has a second index of refraction, and the third infrared transmitting glass composition has a third index of refraction,
wherein the first index of refraction is greater than the second index of refraction,
wherein the second index of refraction is greater than the third index of refraction,
wherein glass transition temperatures of the first infrared transmitting glass composition, the second infrared transmitting glass composition, and the third infrared transmitting glass composition are within 5° C. of each other;
heating the first infrared transmitting glass composition, the second infrared transmitting glass composition, and the third infrared transmitting glass composition above a highest glass transition temperature of the glass transition temperatures to fuse the first infrared transmitting glass composition, the second infrared transmitting glass composition, and the third infrared transmitting glass composition together to form the infrared-transmitting graded optic,
wherein the first infrared transmitting glass composition is $As_{39}$ and $S_{61}$, and
wherein the second infrared transmitting glass composition is $As_{38}$ and $S_{62}$.

11. The method of claim 10, wherein the third infrared transmitting glass composition is $As_{37}$ and $S_{63}$.

12. The method of claim 10, further comprising:
extruding the infrared-transmitting grade optic into a rod, wherein the rod has a radially graded refractive index profile.

13. The method of claim 12, further comprising:
stretching the rod to form another rod with a diameter smaller than the rod.

* * * * *